Figure 1:
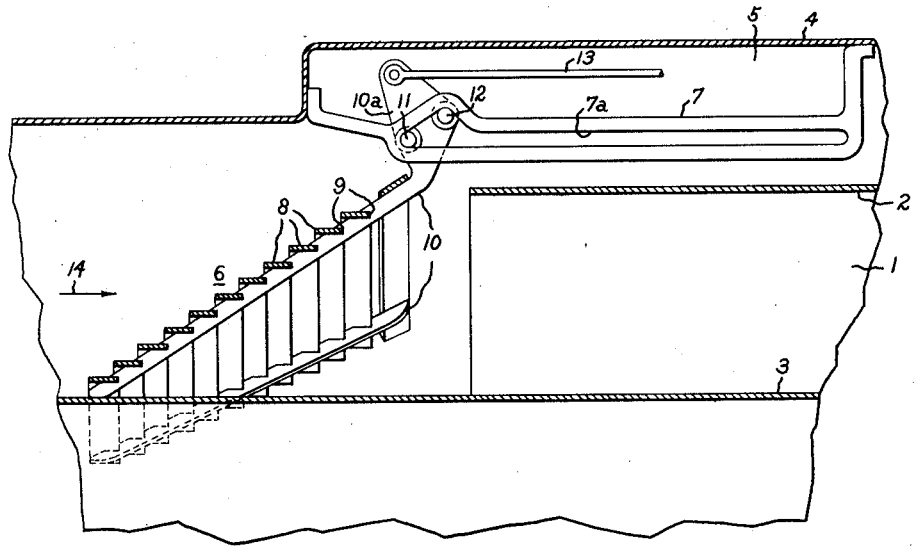

Dec. 12, 1950     D. Q. MARSHALL     2,534,138
PROTECTIVE DEVICE FOR GAS TURBINES
Filed Oct. 25, 1949     2 Sheets-Sheet 1

Inventor:
Daniel Q. Marshall,
by Ernest C. Britton
His Attorney.

Dec. 12, 1950     D. Q. MARSHALL     2,534,138
PROTECTIVE DEVICE FOR GAS TURBINES
Filed Oct. 25, 1949     2 Sheets-Sheet 2
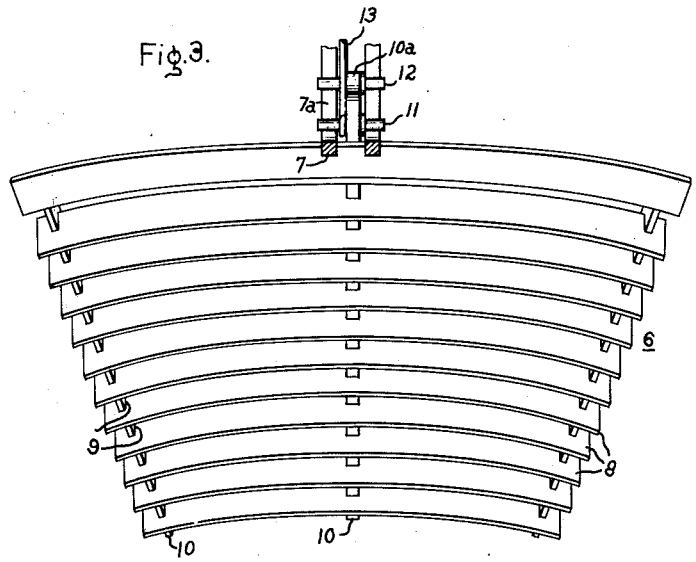
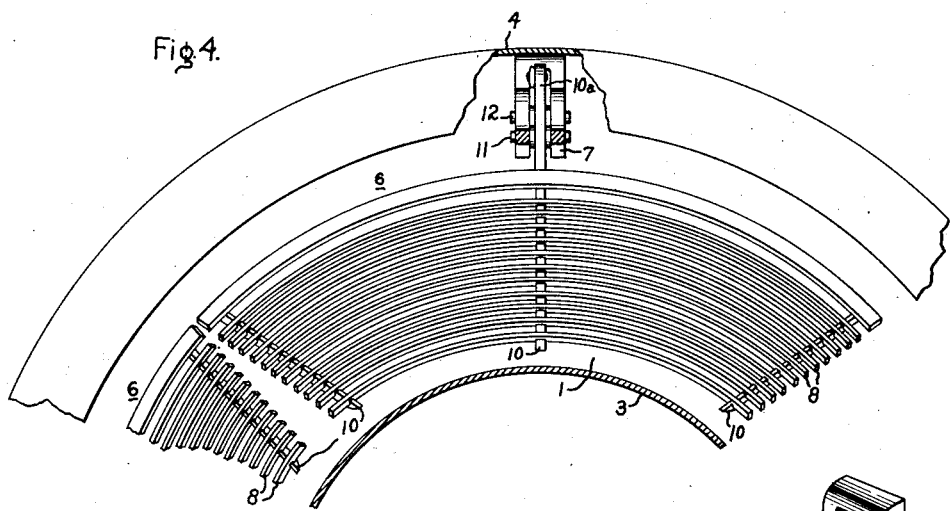
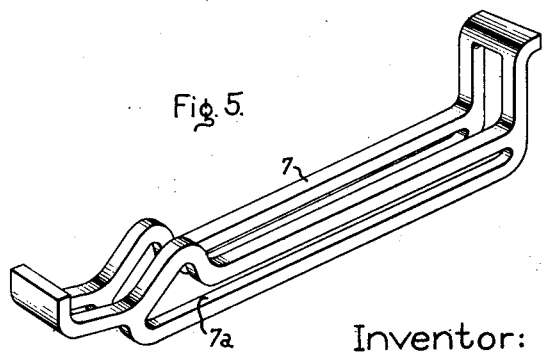
Inventor:
Daniel Q. Marshall,
by Ernest C. Britton
His Attorney.

Patented Dec. 12, 1950

2,534,138

UNITED STATES PATENT OFFICE 2,534,138

PROTECTIVE DEVICE FOR GAS TURBINES

Daniel Q. Marshall, Madeira, Ohio, assignor to General Electric Company, a corporation of New York Application October 25, 1949, Serial No. 123,382

1 Claim. (Cl. 183—33)

This invention relates to fluid energy converting apparatus and particularly to retractable means for preventing foreign particles from entering such apparatus.

In aircraft service it has been customary to provide a grille or screen in the inlet passage of gas turbine type power plants to prevent pebbles or other foreign objects from passing through the power plant during operation at or near ground level. The provision of such a grille or screen is made at the expense of output and efficiency of the power plant because of the pressure drop which exists across the grille. Experience has shown that the pressure drop across the grille or screen may exceed one pound per square inch, which may adversely affect the output of the power plant as much as 7 per cent. In addition, if the power plant is intended for high altitude operation, experience has shown that there is considerable tendency for ice to form on the screen or grille. The icing condition may be of greater consequence than the mere reduction of output resulting from an increased pressure drop which results from the ice formation. As ice accumulates, it partially blocks the inlet passage of the power plant, thereby choking the air flow and, under such conditions, the temperature level at which the turbine operates has been observed to increase to a marked degree. In general, the output of a gas turbine power plant increases with increasing temperature level, while the life of various critical structural elements decreases. Accordingly, it is desirable to operate such power plants at the highest temperature level which is consistent with the desired life expectancy of the above-mentioned structural elements. With these considerations in mind, it will be obvious that if an icing condition occurs which tends to increase the temperature level at which the turbine is operating, almost immediately the turbine will begin to operate at an unsafe temperature level and premature deterioration of parts and perhaps even failure of the parts is to be expected.

Accordingly, it is an object of the invention to provide novel and improved apparatus for obviating the above-mentioned difficulties.

Another object is to provide protection to a gas turbine type of power plant against the entry of foreign objects and for minimizing the pressure drop in the power plant inlet duct during periods when such protection is not required.

A further object is in the provision of means for preventing excessive ice formation in an inlet duct.

Still another object is in the provision of a retractable grille wherein foreign objects which may be lodged therein are prevented from passing through the gas turbine when the grille is retracted.

Figure 2:
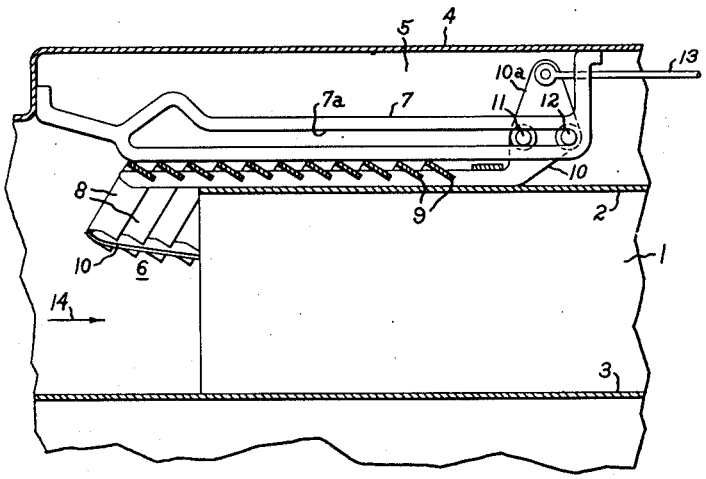

Other objects and advantages will be apparent from the following description taken in connection with the accompanying drawings in which Fig. 1 is a sectional view of an inlet passage of a gas turbine power plant provided with a retractable grille in accordance with the invention; Fig. 2 is a view as in Fig. 1, but with the grille in the open or retracted position; Fig. 3 is a top view of a grille segment; Fig. 4 is a view looking axially into the inlet passage in the direction of flow showing portions of two adjacent grille segments in a partially open position; and Fig. 5 is a perspective view of the grille supporting member.

Referring now to Fig. 1, atmospheric air enters the power plant through an annular inlet duct 1 formed by walls 2, 3. The structural details of the power plant are not essential to an understanding of the present invention and, therefore, are not shown. The details of such power plants are described with greater particularity in Patent No. 2,432,359—Streid, and in copending applications of Alan Howard, Serial No. 506,930, filed October 20, 1943, now Patent 2,479,573, Serial No. 541,565, filed June 22, 1944, and assigned to the assignee of the present application. A third wall 4 is spaced from wall 2 to define a second passage 5 which serves a double purpose which will become apparent as the description proceeds. A protective grille or screen 6 is pivotally supported by a supporting member 7 which may be secured to the outer wall 4 by welding or by any well known type of securing means.

As illustrated, grille 6 comprises a plurality of spaced metallic strips 8 supported in notches or slots 9 which are provided in finger-like supporting members 10. The spacing of metallic strips 8 is made sufficiently small to prevent the entry of foreign objects of a predetermined size into passage 1. It is desirable to keep said spacing as large as possible so as to minimize the pressure drop across the grille. One of the finger members 10 is provided with an outer end portion 10a having two spaced pivots 11, 12 secured thereto. Pivots 11 and 12 are slidably supported in a slot 7a in support member 7. End portion 10a is flexibly connected to a rod member 13 which is, in turn, connected to any desired type of retracting mechanism (not shown).

During operation at or near ground level, rod 13 is moved to the left so that grille 6 takes the position indicated in Fig. 1. Air flow to the power plant is from left to right in the drawing, as indicated by arrow 14. With the grille 6 in the position shown in Fig. 1, foreign objects of a size greater than the spacing between metallic strips 8 are prevented from entering the power plant.

When protection from foreign objects is not required and where there may be a tendency for ice particles to accumulate on the surface of grille 6, rod 13 is moved to the right, which causes the grille to rotate in a clockwise direction about pivot 11 until pivot 12 contacts the lower surface of slot 7a in support member 7. In this position, finger 10 will be substantially parallel to the surface of wall 2, as indicated in Fig. 2. It will be apparent that further movement of rod 13 to the right will cause grille 6 to be moved axially from passage 1 into passage 5, as is clearly indicated in Fig. 2. A feature of the invention is that the free or inner end portion of grille 6 is at all times at a location upstream from pivot 11. Therefore, any foreign particles which may become lodged against the grille while it is in the position shown in Fig. 1 will tend to be retained therein during retraction and eventually blown out through passage 5 instead of being allowed to enter the power plant with the probable consequence of great damage thereto.

Thus, it will be seen that the invention provides protection to the power plant against damage by preventing entry of foreign objects during periods when such protection is needed, and provides means for removal of such protection so as to minimize pressure drop during periods when protection is not needed, as well as minimizing the tendency for ice to accumulate in the inlet passage of the power plant during such periods.

While a particular embodiment of the invention has been illustrated and described, it will be obvious to those familiar with the art that various changes and modifications may be made without departing from the invention, and it is intended to cover in the appended claim all such changes and modifications that come within the true spirit and scope of the invention.

What I claim as new and desire to secure by Letters Patent of the United States is:

In combination, spaced first and second walls forming surfaces of revolution defining a first annular fluid passage, a third wall secured to said first wall and spaced therefrom to define a second fluid passage surrounding said first passage, said first wall also defining a plurality of tangentially extending openings communicating between said first and second passages, a grille comprising a plurality of segments having inner and outer edge portions and forming a substantially continuous conical surface extending through said openings and between said first and second walls, the inner edge portion contacting said second wall at a location upstream from said openings and said outer edge portion being located within said second passage, means for supporting said grille comprising a support member secured to said first wall and within said second passage and having an axially extending slot therein, pivot means connected to said segments and supported in said slot, and retraction means connected to the outer edge portions of said segments, whereby initial movement of said retraction means causes said segments to pivot relative to said support member and subsequent movement of said retracting means causes said segments to be transferred from said first passage to said second passage.

DANIEL Q. MARSHALL.

REFERENCES CITED

The following references are of record in the file of this patent:

UNITED STATES PATENTS

| Number | Name | Date |
|---|---|---|
| 146,115 | Westover | Dec. 30, 1873 |
| 2,381,705 | Vokes | Aug. 7, 1945 |
| 2,407,194 | Vokes | Sept. 3, 1946 |